United States Patent
Mao et al.

(10) Patent No.: US 8,306,979 B2
(45) Date of Patent: Nov. 6, 2012

(54) SERVICE QUERY, SELECTION, ROUTING AND PROPAGATION

(75) Inventors: Xin Sheng Mao, Beijing (CN); Li Yi, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 12/295,578

(22) PCT Filed: Mar. 27, 2007

(86) PCT No.: PCT/EP2007/052894
§ 371 (c)(1),
(2), (4) Date: Jul. 9, 2009

(87) PCT Pub. No.: WO2007/113164
PCT Pub. Date: Oct. 11, 2007

(65) Prior Publication Data
US 2010/0017368 A1    Jan. 21, 2010

(30) Foreign Application Priority Data
Mar. 31, 2006 (CN) .......................... 2006 1 0071038

(51) Int. Cl.
*G06F 17/30* (2006.01)

(52) U.S. Cl. ....................................... 707/736; 707/741
(58) Field of Classification Search .................. 707/736
See application file for complete search history.

(56) References Cited

U.S. PATENT DOCUMENTS
2002/0174191 A1* 11/2002 Robertson et al. ............ 709/217
* cited by examiner

*Primary Examiner* — Christyann Pulliam
*Assistant Examiner* — Mellissa M Chojnacki
(74) *Attorney, Agent, or Firm* — Yudell Isidore Ng Russell PLLC (57) ABSTRACT

Improvements are provided in a service registry in SOA and in service propagation, query, and service selection and routing methods during service invocation. The service registry is connected with a local service domain and a remote service registry and comprises: a local service information manager for registering local services in the local service domain; and a local service information repository connected with the local service information manager for storing service metadata of the local services. The service registry further comprises: a remote service information manager connected with the local service information manager and the remote service registry for receiving a remote service index from the remote service registry; and a remote service information repository connected to the remote service information manager for storing the remote service index received from the remote service registry. The service registry makes it easy to realize service control and share among different service registries.

20 Claims, 7 Drawing Sheets

SERVICE QUERY, SELECTION, ROUTING AND PROPAGATION

FIELD OF TECHNOLOGY

The present invention relates to a service-oriented architecture. More particularly, the present invention relates to improvements in a service registry in the SOA and improvements in relevant service propagation, query, service selection and routing methods during service invocation.

BACKGROUND ART

SOA is the abbreviation of "service-oriented architecture" and indicates that an application can be composed of a set of independent and mutually cooperative sub-systems or services. Such an architecture makes every service independent and only informs other services of the interface necessary to be declared. The SOA not only enables system constructors to organize and decrease dependency relations in their designed products, but also provides a trimmed service suite in a developing environment. This method can be used to support the existing requirements, e.g., the enterprise application assembly, and to provide a base for platform extension so as to meet special commercial needs, e.g., the quick customization of E-commerce-related solutions.

As a basic delivery form of the SOA, web services are widely used day by day. The so-called web services are online application services published by an enterprise for satisfying its special commercial needs, and these online services can be accessed and utilized by applications of other companies and cooperative partners via networks (including the Internet, enterprise internal networks, and enterprise external networks, etc.). The web services, as an effective mechanism of flow integration in an enterprise, are utilized in commerce, Nasdaq and Australia Stock Exchange System and so on are well-known examples that use the web services. In fact, the web services can perform any function from a simple request to a complicated commercial transaction.

Figure 1:
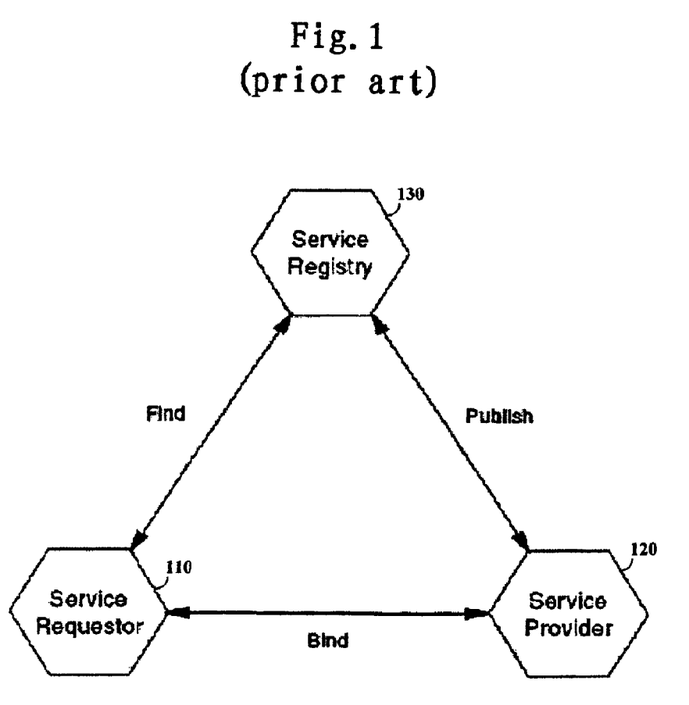
FIG. 1 is a schematic view of the prior-art SOA framework.

Any SOA or web service comprises three roles: a service requester (or called a service consumer), a service provider and a service registry, as shown in FIG. 1. The architecture 100 shown in FIG. 1 comprises a service requester 110, a service provider 120 and a service registry 130.

Among these, the service provider 120 is responsible for building a useful service and establishing a service metadata therefor, and then publishes the metadata to one or more service registries 130, so that the service requester queries service metadata from the one or more service registries 130. The metadata may comprise functional description and non-functional description, policies, and relevant data, etc of the services.

The service registry 130 is a metadata repository for services that participate in an SOA and is responsible for maintaining and promulgating service metadata published thereon by the service provider 120, and allows the service requester 110 to perform query in a service description owned by a local service registry 130. In the prior-art SOA, it is not necessary for the service registry 130 to participate in an interacting process between the service requester and the service provider.

In addition, between the service requester 110 and the service provider 120, some intermediators such as a gateway, an enterprise service bus (EBS) and so on (not shown) may further be provided. These intermediators have a simple request-response delivery function between the service requester 110 and the service provider 120.

FIG. 1 further shows the SOA contains three operations among the service requester 110, the service provider 120 and the service registry 130: publish, find and bind, and these operations define a contract among the respective roles of the SOA.

To date, in the SOA or the web service system as described above, the service registry can only employ the Universal Description Discovery & Integration (UDDI) standard. All the vendors of the service registries (such as IBM®, Microsoft®, SUN®, BEA®, Systinet®, etc.) support UDDI 3.0 in their products. UDDI is a standard defined by OASIS and its focus is the definition of a set of services supporting the description and discovery of 1) businesses, organizations, and other web service providers;

2) the web services that are available; and 3) the technical interface which may be used to access the web services.

Based on a common set of industry standards, UDDI provides a foundational infrastructure for web services based computing environment. However, the use of UDDI standard result in technical limitations of the SOA or web services in terms of service control and sharing, etc. On one hand, as to the control and management of service metadata, using the UDDI standard has the following disadvantages:

1) Lack of extensible data model and methods for query—The fixed format of service metadata could not meet the need to add more features or service specific properties;

2) Lack of service lifecycle management;

3) Lack of runtime control during service invocation—This is because in the existing SOA triangular architecture, a service registry only plays its role in a static configuration process of services, but does not participate in a dynamic interacting process between a service requester and a service provider (including the gateway or EBS, etc.) during service runtime; and 4) Lack of mechanism for functionality extension.

On the other hand, with the wide use of web services at present, the number of services become large with advent of more and more fined services that are compliant with different standards (such as WSRP, uPnP, etc.). Thus, the number of service registries increases rapidly as well. In this situation, sharing information among associated UDDI registries become the urgent requirement to promote web service technologies.

According to the stipulation of Version 3 of UDDI specification, sharing information among UDDI registries is implemented by replicating service metadata, that is, an importer gets all the metadata of UDDI entities from source registries and then replicates said metadata into target registries. The importer here is a publisher who reads data via the Inquiry or Subscription API from one or more source registries and publishes it to a target registry. For detailed information for sharing information in UDDI, please refer to "UDDI Version 3.0.2, UDDI Spec Technical Committee Draft, Dated 20041019". The mechanism for implementing service sharing among the UDDI registries by replication has the following disadvantages:

1) The topology of UDDI registries is different from that of the internet domain, so it is hard to manipulate service information in every internet autonomous system.

2) As the number of registries and UDDI entities becomes large, there is hardly enough storage space to replicate all the metadata of all the entities in one registry.

3) When information sharing is implemented by replication of entities, there lacks a mechanism to synchronize duplicates of the same entity registered in different registries.

4) Since not all the shared UDDI entities could be replicated in one UDDI registry, a UDDI client must query several UDDI registries to search for the target UDDI entity.

5) As the quantity of registries becomes large and there is no centralized location information of UDDI registries, it is difficult for the client to find and travel through all the accessible registries (especially for the client with limited computing power and communication bandwidth).

In view of the above cases, it is necessary to improve the service registries of the SOA or web services so as to enhance flexibility and operability with respect to management and sharing service.

SUMMARY

Therefore, the present invention sets forth a new service registry, a system architecture centering on the service registry, methods for service propagation and query, and methods for service, selection and routing during service invocation. Concepts of the present invention lie in: expanding functions of a service registry by service information distributed index and query; realizing service sharing by only replicating service indexes (instead of service metadata) among the service registries; performing runtime control over services by causing, a service registry to participate in a dynamic running process between a service requestor and a service provider, thereby breaking through technical limitations resulting from the utilization of the UDDI standard.

According to a first aspect of the present invention, a service registry is provided, which is connected with a local service domain and a remote service registry, and comprises: a local service information manager for registering local services in the local service domain, and a local service information repository connected to the local service information manager, for storing service metadata of the local services; characterized in that said service registry further comprises: a remote service information manager connected with the local service information manager and the remote service registry, for receiving a remote service index from the remote service registry; and a remote service information repository connected to said remote service information manager, for storing the remote service index received from the remote service registry.

According to a second aspect of the present invention, a SOA framework is provided, comprising: a meta service network including the above-mentioned service registry; a service network parallel with the meta service network and including one or more endpoints; and on or more intermediators intervening between said endpoints; wherein said one or more endpoints can interact with the corresponding service registry directly or via said one or more intermediators.

According to a third aspect of the present invention, a method for sharing service information among service registries is provided, said service registries being physically and/or logically interconnected, wherein said method comprises: registering service metadata of a service provider to a local service registry of said service provider; and propagating, by said local service registry, a service index in said service metadata to a remote service registry.

According to a fourth aspect of the present invention, a method for a service requester to query service information from a service registry, said service registries being physically and/or logically interconnected, wherein said method comprises: said service requester sending a request for inquiring about service information to a local service registry; said service registry transferring said request to a relevant target remote service registry, based on a service index of remote services, until said request reaches one or more target remote service registries; said one or more target remote service registries sending back to said local service registry the requested service metadata as a response; said local service registry sending said response to said service requester.

According to a fifth aspect of the present invention, a method for a service requester to invoke a service in a remote service domain is provided, said method comprising: said service requester sending to an intermediator a request for invoking a service in the remote service domain, and the intermediator sending the request to a local service registry; said local service registry transmitting the request to the remote service domain by inquiring about a service index; an intermediator of the remote service domain sending said message to a service registry associated with said remote service domain; the service registry associated with said remote service domain sending said service via the intermediator of the remote service domain to said service provider, so as to provide said service requester with said service.

By using the present invention, the service registries are endowed with new effects and functions. First, each service registry is capable of completely controlling one or more autonomous domains, which is convenient for owners (enterprise, organization or department) of the service registries to maintain service information. Second, each service registry is capable of providing the following functions: managing static and dynamic service metadata (local data and a remote data index) in a local domain; inquiring about service metadata in all the connected registries; and performing service selection and routing centered on the service registry within or among the service domains.

By using the present invention, an extensible mechanism that deploys a function module for service routing is provided, which not only realizes a function enhancing mechanism, like an application server, for service routing and selection, but also achieves connection with an external system (e.g., billing, commercial rules, security, monitoring, etc.).

Furthermore, by using the present invention, inter-domain connection can be realized, which is mainly reflected on the following three points. First, the topology of the service domain in the present invention is more natural and it is similar to the topology of an Internet autonomous system that can be mapped to an application domain of an enterprise or organization. Second, in the present invention, all the registries are connected by index instead of by replicating service metadata. Finally, all the service requesters and intermediators (ESB, WS gateway and so forth) do not need to have information relating to services outside the local service domain.

BRIEF DESCRIPTION OF THE ACCOMPANYING DRAWINGS

In the accompanying drawings, the same composite parts utilize the same or similar reference signs.

BEST MODE FOR CARRYING OUT THE INVENTION

The principles of the present invention are described below with reference to the accompanying drawings.

Figure 2:
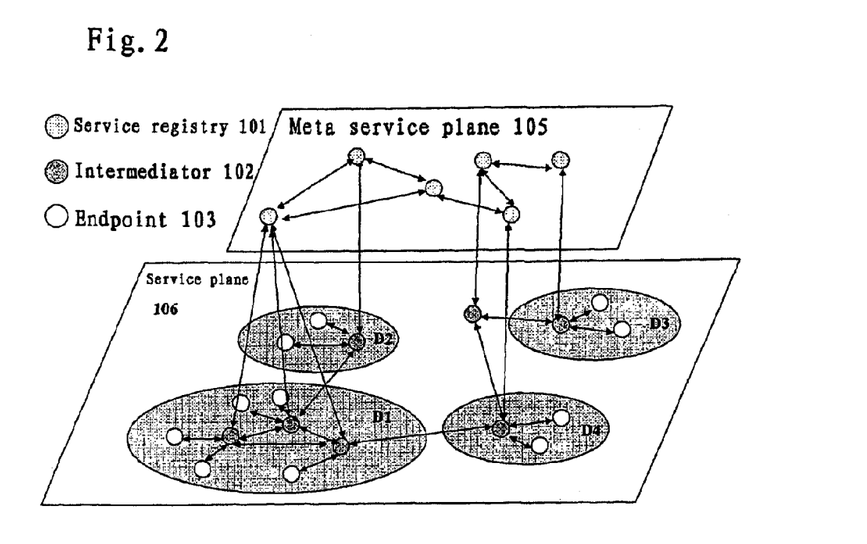
FIG. 2 is a schematic view of the topology of a system centered on a service registry according to an embodiment of the present invention.

Before describing an novel service registry according to the present invention, we should first know an overall topology of a system to which said service registry is applied, and FIG. 2 is a schematic view of the topology. This topology comprises a meta service plane (or called a meta service network) 105 and a service plane (or called a service network) 106. The meta service plane 105 includes a number of service registries 101, a connection line between which indicates that they are physically and/or logically interconnected. The service plane 106 may include a number of service domains D1-D4 surrounded by ellipses, and each of the service domains D1-D4 further contains some endpoints 103 and intermediators 102, and the service plane 106 may further include a single endpoint and/or intermediator (a single intermediator 102 between the service domains D2 and D3 as shown in FIG. 2) which does not form a service domain. It should be pointed out that FIG. 2 is exemplary and should not be understood as any limitation on the actual number and connection manner of the service registries 101, the intermediators 102, the endpoints 103 and the service domain 104, etc.

In the topology shown in FIG. 2, each of the service registries 101 is responsible for service registration and propagation in a local service domain and for dynamically tracking local service information; responsible for responding to a service query request (extensible query function to get meta information of a target service) from a client software developer and a service requester; and responsible for service selection and routing based on coordination with the intermediator 102. The service registries 101 interact with each other, and all the service registries together build up the meta service plane. In dependence upon the status of an application domain, the service registries may have a plurality of topologies, e.g., a star structure, a fully meshed structure, a super-peer based structure, a pure peer-to-peer structure and so on. It should be pointed out that, which topology and connection mechanism is adopted among said service registries is not relevant to the implementation of the present invention.

In the service plane, each of the service domains D1-D4 is a logic set of web services registered in a specified service registry. The service domain could be a domain with explicit boundary (such as Internet domain), or that without explicit boundary (such as part of Internet domain). Each service registry may correspond to a service domain, which is called "a local service domain" of the service registry.

In the service domain, each of the intermediators 102 is used for forwarding and transforming information within or among the service registries and provides a path for the service routing between a service requester and a service provider. The parts such as Enterprise Service Bus (EBS) or Service Gateway and so on can act as said intermediators.

Each of the endpoints 103 is a message initiator or a final destination and it may include a service requester and a service provider.

All the connected endpoints and intermediators build up the service plane 106 that is parallel with the meta service plane 105.

Figure 3:
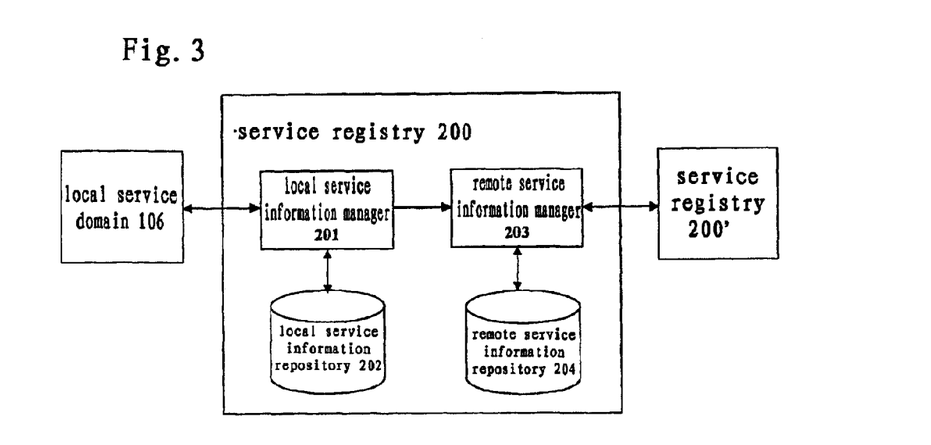
FIG. 3 is a basic structure of a service registry according to an embodiment of the present invention.

Referring now to FIG. 3; the basic structure of a service registry 200 according to an embodiment of the present invention is explained below. In FIG. 3, the service registry 200 is connected to a local service domain 106 and a remote service registry 200'. It should be understood that, for the sake of clarity, FIG. 3 only shows one remote service registry 200', but actually, the service registry 200 can be connected with any number of remote service registries. In addition, the service registry 200 comprises a local service information manager 201, a local service information repository 202, a remote service information manager 203 and a remote service information repository 204. By using the structure as shown in FIG. 3, the processes of local service registration, propagation and updating and the processes of service requesting and invocation can be performed at the service registry 200.

As to the processes of local service registration, propagation and updating, the local service information manager 201 is connected with service providers or management tools in the local service domain 106, so that the service providers or the management tools can (e.g., via API) register services to the local service information manager 201. The local service information manager 201 is further connected with the local service information repository 202, so as to store into the local service information repository 202 service metadata registered in the local service domain on one hand, and on the other hand, to dynamically track real-time status of local services directly or indirectly and update the relevant service metadata in the local service information repository 202 when the local services change. Furthermore, the local service information manager 201 is further connected with the remote service information manager 203 to notify the remote service information manager 203 of local service information and the update thereof (e.g., change in the status of the services), so that the local service information and the update thereof are propagated to all the other directly connected service registries 200'. During the propagation of the local service information, the local service information manager 201 will extract information suitable to serve as a service index from the local service metadata.

"Service metadata" are metadata for describing services, for example, functional description of services, including service interface description, e.g., WSDL (Web Service Definition Language)-based description (including operations, message formats, etc.); non-functional description of the service (such as service owner—IBM, XSD (XML Schema definition), service location—Beijing); service policies (such as service policy description based on such standards as WS-Policy (Web Service Policy), e.g. security, transaction and reliability policies, etc.); and other metadata.

The term "index" or "service index" is information relating to remote services stored in a local service registry. For example, the service registries 200 and 200' serve as a remote service registry for each other, wherein the service registry 200 only stores a service index (instead of service metadata) relating to the services of the service registry 200', and the service registry 200' also only stores a service index relating to the services of the service registry 200.

The metadata information suitable for being an index or service index comprises but is not limited to: the WSDL description, the service owner or service location or the like in the non-functional description, and the attribute name, the attribute range, the last hop address of a service and the like of the service metadata that are suitable for being an index, as described below in detail. In addition, the metadata information for serving as the service index can be extracted by the local service information manager 201 and can also be extracted by other proper ways, or can be designated by a service provider during the service registration.

Figure 3A:
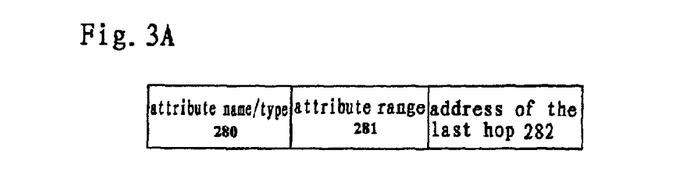
FIG. 3A shows an exemplary data structure of a service index according to an embodiment of the present invention.

FIG. 3A shows an exemplary data structure of a service index according to the present invention, which comprises at least three fields: attribute name/type 280, attribute range 281 and the last hop address 282. It is understandable that said index table can further comprise any other necessary fields as required.

Table 1 records a series of index table items, wherein the metadata items can be used for indexing.

| | | Last hop address | |
|---|---|---|---|
| Attribute Name/Type | Attribute range | Service Registry | Intermediator/Endpoint |
| Company Name | IBM | SR1 | I1 |
| Telephone number | 66660000-66660010 | SR1 | I1 |
| Location | Beijing | SR1 | I1 |
| Time of Issue | the year of 2005 | SR1 | I1 |
| Service Interface Name | http://www.ibm.com/service1/service1-5.wsdl | SR1 | I1 |

In Table 1, the attribute range field can be either a single attribute value or attribute values within a range. The last hop address indicates the address of the last service registry and the corresponding intermediator/endpoint address in the propagation path of the index value with respect to a local service registry.

Continuing to refer to FIG. 3, the local service information repository 202 is connected with the local service information manager 201 so as to store service metadata and the update thereof of a service provider in a local service domain.

The remote service information manager 203 is connected with the local service information manager 201, so as to, for example, propagate local service information to the connected remote service registry 200' according to a connection policy when an event from the local service information manager 201 is triggered. The remote service information manager 203 is further connected with the remote service registry 200' for receiving a remote service index sent from the remote service registry 200' and propagating it to another remote service registry on one hand, and propagating the extracted service index relating to local services to for example the remote service registry 200' on the other hand. In addition, the remote service manager 203 is further connected to a remote service information repository 204 for storing the received remote service index therein.

The remote service information repository 204 is used for storing the service index propagated from the remote service registry 200'.

In the processes of service query and invocation, the local service information manager 201 and the remote service information manager 203 are connected with intermediators in a local service domain 106, so as to receive from the intermediators a service request performed by a service requester.

In response to receiving the request from the intermediators, the local service information manager 201 and the remote service information manager 203 respectively extract, from the local service information repository 202 and the remote service information repository 204, service metadata and a service index that satisfy the service request, and return them to the intermediators. It should be pointed out that, since the process of invoking a local service belongs to the prior art, while the present invention aims at improving the invocation of a remote service, the present invention generally assumes that only the remote service could satisfy the service request.

Figure 3B:
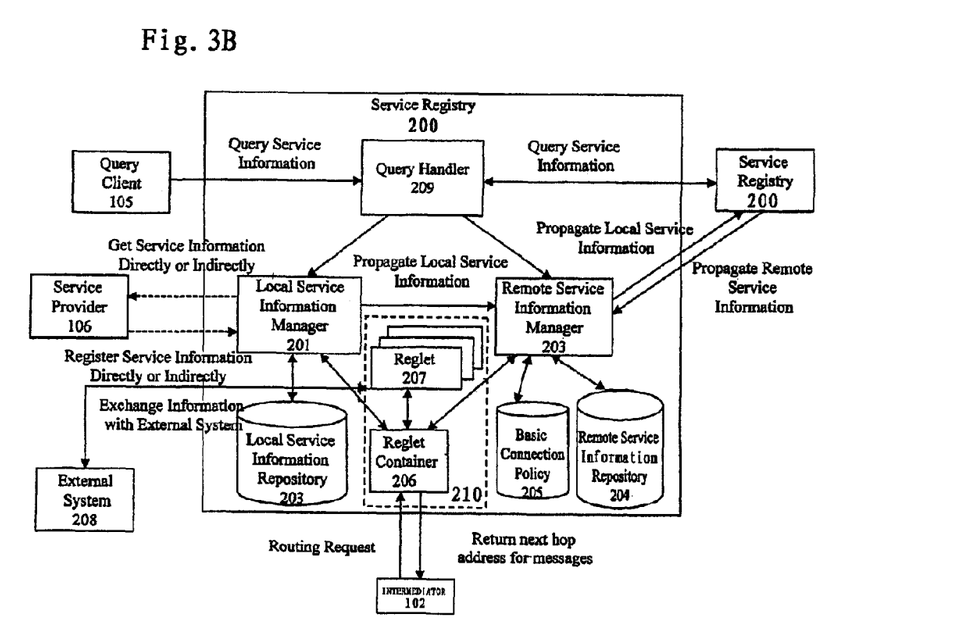
FIG. 3B shows a structural view of a service registry including additional details according to an embodiment of the present invention.

FIG. 3B shows a structural view of a service registry 200 including additional details, wherein besides the parts shown in FIG. 3, the service registry 200 further comprises a basic connection policy repository 205, a reglet portion 210 and a query handler 209.

The basic connection policy repository 205 is connected with the remote service information manager 203, for storing the description of a basic policy for building connection among service domains (service registries), based on which the service registry or intermediator could determine with which it could exchange information. Said connection policy can stipulate the follows: whether the service registries are physically interconnected; as to the service registries physically connected, whether it is possible to share information therebetween logically; and whether it is logically necessary to shield off special information in terms of special service registries. It should be understood that the stipulation of the connection policy among the service registries can further improve the intelligence and operability of the SOA system. However, in fact, the service registries can also abide by a fixed connection relation, so that it is not necessary to store any connection policy.

The reglet portion surrounded by a dotted-line box is a portion for expanding functions of the service registries and comprises some reglets uniformly represented by reference sign 207 and a reglet container 206.

The reglets 207 may include any static or dynamic reglet which facilitates performance of the functionality for service selection and routing. For example, they can be the reglets contained inside the service registries and can also be the reglets realized by the interaction with an external system 208 (as described below). The reglets 207 can receive a service routing request from a local service domain and return a routing response to the local service domain based on a certain connection policy (e.g., the policies stored in the basic connection policy repository 205). The reglets 207 could implement the logic for service selection and routing.

Said reglets 207 are deployed in the reglet container 206 and forms therein a list or a mesh. The reglet container 206 provides runtime environment and context information for the reglets 207. For example, during runtime, the reglet container 206 receives from an intermediator a request containing sources and target information of messages. After that, it queries the basic connection policy and invokes all the related reglets 207 for service selection and routing. Finally, the reglet container 206 returns a response containing the next hop address.

The external system 208 is connected with the reglet portion 210, and it could provide information for service selection and routing and could also utilize information from the reglet portion 210 (e.g., the reglets 207). The reglets 207 provide an entry for the external system 208 involved. The examples of the external system 208 comprise but are not limited to: a security system for global security policies; a billing system for services of commercial use; a network traffic system for QoS; a BI system that needs statistic information for data-mining and decision-making; a business rule system for business contracts based on service selection, and so on.

The query handler 209 is connected with the local service information manager 201 and the remote service index manager 203, for handling a query request to a local service registry. The query handler 209 works in the following two modes: in the first mode, when a request from a local service domain is received, the query handler 209 requests both the local service information manager 201 and the remote service index manager 203 to locate the service and sends the response to the service requester; in the second mode, when a request from other registries is received, the query handler 209 requests the local service information manager 201 and returns the local service information to the service requester.

The processes of service registration, propagation and query according to the present invention are explained below with reference to FIG. 4, FIG. 4A and FIG. 4B.

Figure 4:
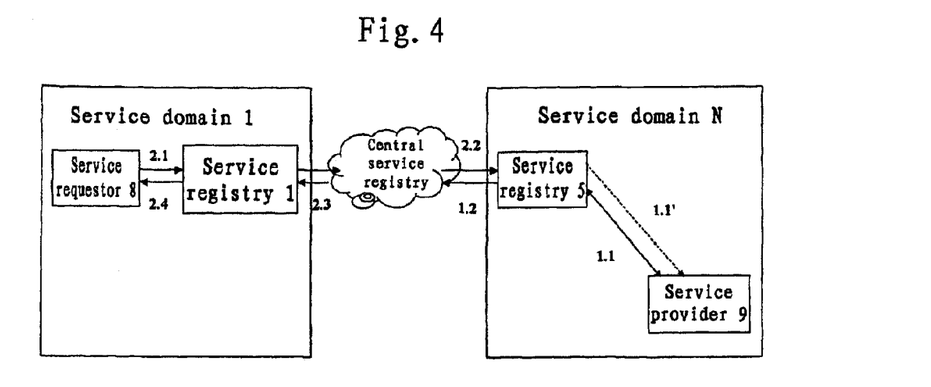
FIG. 4 shows a combining process of registering, propagating and inquiring about services according town embodiment of the present invention.

Process of Registration and Propagation of Local Service by the Service Registry In FIG. 4, suppose a service provider 9 in a service domain N has a new service to be registered to a local service registry 5 thereof and to be shared with other service registries. Thus, on Line 1.1 (or 1.1'), the service of the service provider 9 is registered to the service registry 5 thereof. This registration can be implemented in different ways, for example, the service provider or the third party performing registration to the service registry 5 (as Line 1.1 shows), or the service registry 5 achieving automatic discovery of the service (as Line 1.1' shows). Subsequently, on Line 1.2, the service registry 5, for example, based on the basic connection policy, propagates the local service index to a remote service registry connected with the service registry 5.

Figure 4A:
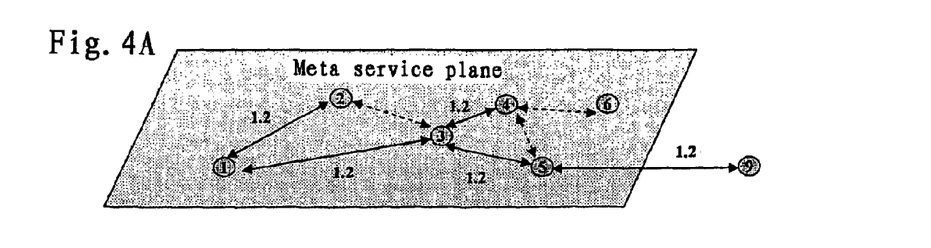
FIG. 4A shows an exemplary propagation path.

FIG. 4A is an exemplary propagation path and shows details of Line 1.2. In FIG. 4A, a quadrangle represents a meta service plane which contains service registries represented by reference signs 1-6, wherein a solid line, for example, between service registries 1 and 2 represents that the service index could be logically propagated from the service registry 1 to the service registry 2, while a dotted line, for example, between the service registries 2 and 3 represents that the service index could not be logically propagated from the service registry 2 to the service registry 3. In FIG. 4A, the service of the service provider 9 is registered to the service registry 5 and could be propagated to remote service registries 1-4. Taking the process of propagation by the service registries 5□3□1 as an example, the service registry 3 receives an index indicating that the last hop address is service registry 5, while the service registry 1 receives an index indicating that the last hop address is service registry 3.

Process of Requesting Service Metadata by Service Requestor

Continuing to refer to FIG. 4, suppose a service requester 8 in a service domain 1 queries, with specific parameters (e.g., the shortest service time, the lowest service charge and so on), to a local service registry thereof for all the available services. Thus, on Line 2.1, the service requester 8 sends a query request to the service registry 1. Then, on Line 2.2, the service registry 1, based on its index table (and possibly predefined basic connection rules), forwards the request to a service registry of the next hop, and this step will be repeated in the related service registries.

Figure 4B:
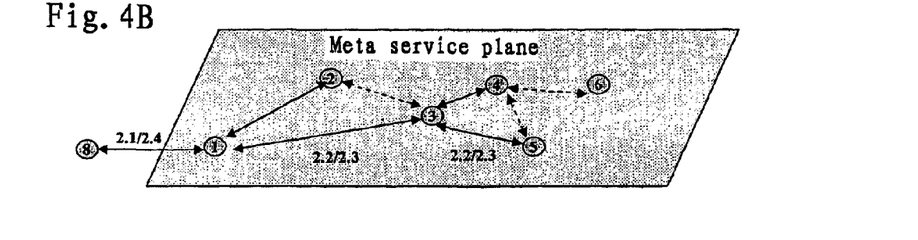
FIG. 4B shows an exemplary query path according to an embodiment of the present invention.

FIG. 4B shows an example of detailed path query on Line 2.2. In FIG. 4B, a meta service plane which is the same as that of FIG. 4A is used. After receiving a query request, the service registry 1, when finding that the last hop address in the service index satisfying the request is service registry 3 (that is, the service index is propagated by the service registry 3), then decides to forward the request to the service registry at the next hop. Subsequently, the service registry 3, using the same manner as the service registry 1, determines to forward the request to the service registry 5 at the next hop. Suppose that service registry 5 is just the service registry to which the service index satisfying the request is registered, and then the operation will enter Line 2.3 in FIG. 4.

On Line 2.3 in FIG. 4, the service registry 5 sends the requested service metadata to the service registry 1 along the path in which the request is forwarded. Finally, on Line 2.4, upon receiving a response, the service registry sends the response to the service requester thereof.

The process of message transmission routing and selection during service invocation according to an embodiment of the present invention is described below with reference to FIG. 5 and FIG. 5A. In FIG. 5A, for clarity, connections among the service registries, connections among the endpoints and the intermediators relating to the process shown in FIG. 5, and their Connections with the service registries are represented by solid lines, and others are represented by dotted lines. In addition, reference numbers on the left side of the bidirectional arrow lines represent uplink lines from the intermediators to the service registries, and reference numbers on the right side represent downlink lines from the service registries to the intermediators.

Figure 5:
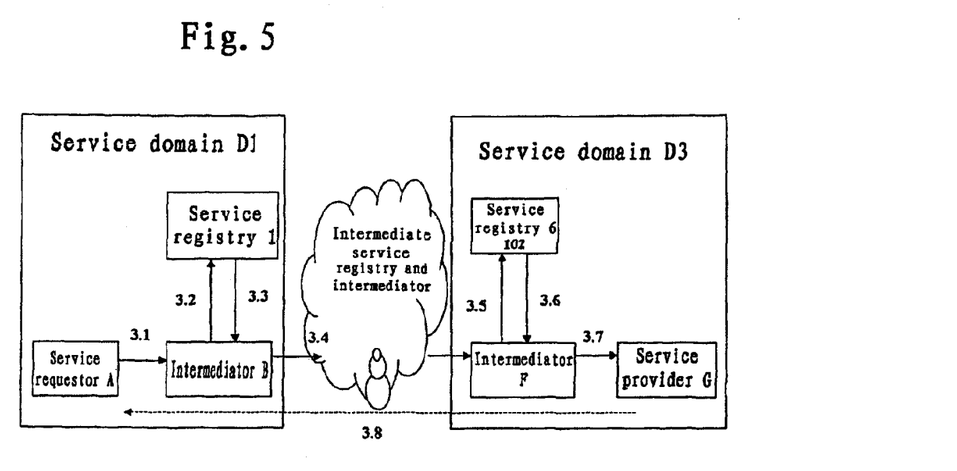
FIG. 5 shows a process for message transmission routing and selection during service invocation according to an embodiment of the present invention.
Figure 5A:
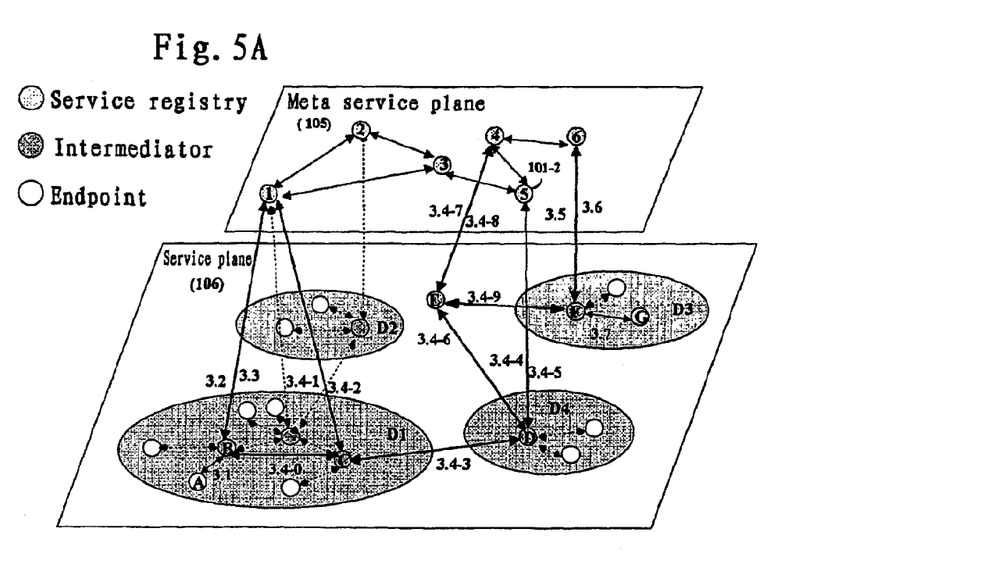
FIG. 5A is a schematic view showing the execution of a sample embodiment of the process in FIG. 5 with reference to the topology in FIG. 2.

In FIG. 5 and FIG. 5A, suppose a service requester A in a service domain D1 expects to obtain a service of a service provider G in a service domain D3. Thus, on Line 3.1, the service requester A in the service domain D1 sends a message to an intermediator B and a target address of the message is the service provider G in the service domain D3. Then, on Line 3.2, the intermediator B sends a routing request to the service registry 1 thereof. Subsequently, on Line 3.3, the service registry 1, by querying the service index, determines the next hop address intermediator (for example, an intermediator C) which the request is destined to. The service registry 1 then notifies the intermediator B of the next hop address. As a result, on Line 3.4, the intermediator B sends the message to the intermediator C.

According to an embodiment of the present invention, Line 3.4 may contain a series of operations between the intermediators and the service registries, until the message arrives at an intermediator F in a target service domain D3. The specific operations on Line 3.4 are explained below with reference to FIG. 5A.

On Line 3.4-0, the intermediator B, based on the address returned by the service registry 1, further sends the request to the intermediator C. Then, the intermediator C continues to query the local service registry 1 via the uplink line 3.4-1 to determine the next hop address (for example, an intermediator D in a different service domain D4) of the request, and the next hop address of the request is returned to the intermediator C via the downlink line 3.4-2. After that, the intermediator C further sends the request to the intermediator D via Line 3.4-3. At this time, the intermediator D queries the local service registry 5 thereof via the uplink line 3.4-4. Having determined the next hop address of the request (e.g, the intermediator E), the service registry 5 returns it to the intermediator D via the downlink Line 3.4-5. Subsequently, the intermediator D sends the request to the intermediator E (Line 3.4-6), and the intermediator E sends the request to the local service registry 4 thereof (Line 3.4-7). Having determined the next hop address (e.g., the intermediator F), the service registry 4 returns it to the intermediator E via the downlink Line 3.4-8. And then, the intermediator E sends the request to the intermediator F in the target service domain D3 via Line 3.4-9. Then, the operations on Line 3.4 are completed. The subsequent process will continue to be described below with reference to FIG. 5.

As Line 3.5 shows, the intermediator F sending the routing request to the service registry 6, so that the service registry 6 selects a target service in a service domain N. Then, on Line 3.6, the intermediator F receives the address and metadata of the target service and transforms the service message to a proper format. In addition, on Line 3.7, the intermediator F sends back the message to the service provider. Finally, as Line 3.8 shows, the service provider G provides the service to the service requester A.

The target service provider G provides a service to the service requester A in many ways. For example, the service provider G could provide the service to the service requester A strictly in an inverse direction of the request transmission direction (namely, through all the intermediators and service registries involved), and could also provide the service to the service requester A in the inverse direction of the request transmission direction but only through the intermediators in the service plane (namely, ignoring the service registries). As known by those skilled in the art, the service provider G can transmit a service to the service requester A using other ways, but they are not listed one by one in the present invention.

Figure 6:
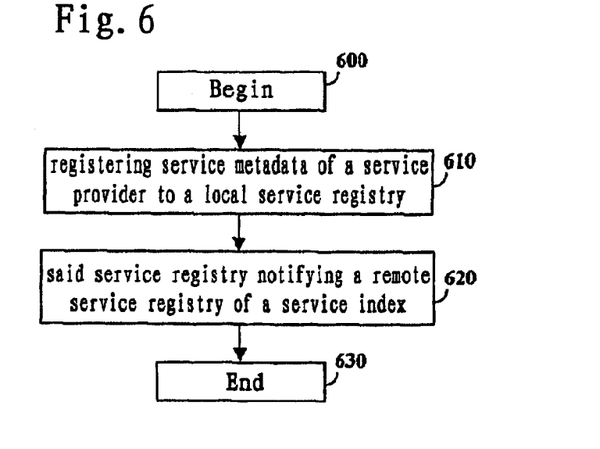
FIG. 6 is a flow chart showing a method for a service registry to register and propagate services according to an embodiment of the present invention.

FIG. 6 is a flow chart showing a method for service registration and propagation by a service registry according to the present invention.

This method begins with step 600 and then goes to step 610. In step 610, service metadata of a service provider is registered to a local service registry thereof. After that, in step 620, said service registry notifies a remote service registry of a service index. This method ends in step 630.

Figure 7:
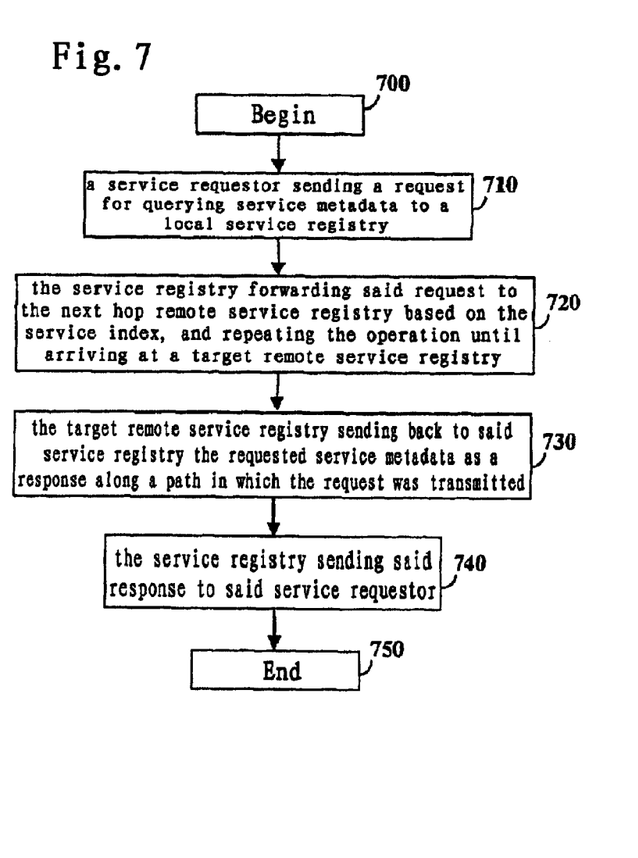
FIG. 7 shows a method for a service requestor to query service metadata of a local service registry according to an embodiment of the present invention.

FIG. 7 shows a method for querying service metadata by a service requester to a local service registry according to the present invention. It should be pointed out that the present invention mainly involves the improvement in remote service query, as a result, the case of querying local service metadata is neglected.

This method begins with step 700 and then goes to step 710. In step 710, a service requester sends a request for querying service metadata to a local service registry, for example, requesting a service satisfying a specific requirement (e.g., the service location being "Beijing"). In step 720, said service registry finds a service index satisfying the requirement by querying a service index table maintained by a remote service information manager, and forwards the request, according to the index, to the next hop remote service registry. Then, the operations in step 720 are repeated, until the request is forwarded to a remote service registry to which a service in the service index belongs. Subsequently, in step 730, a target remote service registry sends back the requested service metadata as a response to said local service registry along a path in which the request was transmitted. Additionally, in step 740, the local service registry sends said response to said service requester. Finally, this method ends in step 750.

Figure 8:
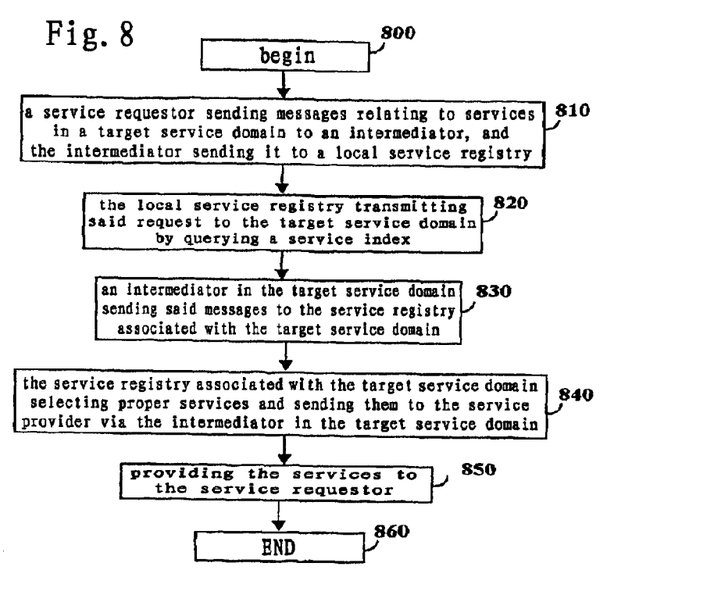
FIG. 8 shows a method of performing service touting and selection according to an embodiment of the present invention.

FIG. 8 shows a method for service routing and selection according to the present invention. Likewise, since the present invention mainly involves the improvement in remote service invocation, the case of invoking local services is neglected.

This method begins with step 800 and then goes to step 810. In step 810, a service requester sends a message relating to a service in a target service domain to an intermediator, and the intermediator further sends it to a local service registry. After that, in step 820, the local service registry delivers a request to the target service domain by querying a remote service index thereof. In step 830, the intermediator in the target service domain sends said message to a service registry associated therewith. Subsequently, in step 840, a service registry associated with the target service domain selects a proper service and sends it through the intermediator in the target domain to a target service provider, so that the service is provided to the service requester in step 850. Finally, this method ends in step 860.

In step 820 shown in FIG. 8, it may be necessary for the request to be forwarded to the target service domain via a plurality of hops as shown in FIG. 5 and FIG. 5A.

Moreover, according to the preferred embodiment of the present invention, it is possible to perform function expansion of the service invocation process shown in FIG. 8 by using a reglet portion. For example, it is possible to charge the service invocation by using a reglet which charges a service request via interaction with external systems. In this case, step 820 may further comprise the operations shown in FIG. 8A.

Figure 8A:
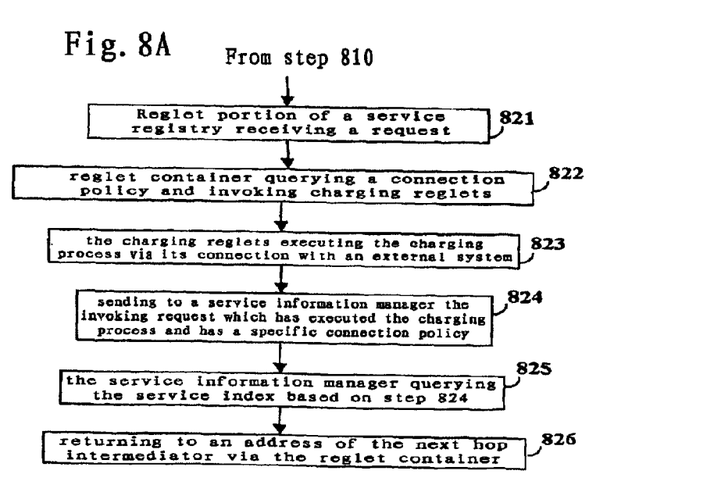
FIG. 8A shows a method of performing service routing and selection according to the preferred embodiment of the present invention.

In step 821, the reglet portion of the local service registry receives a request from a service requester. In step 822, a reglet container searches for a connection policy from a basic connection policy repository on one hand, and invokes the corresponding charging reglet on the other hand. In step 823, the charging reglet executes the charging process of a service invocation request, for example by connecting to the corresponding external system used for charging. After that, in step 824, the invocation request which has been charged and has the specific connection policy is sent to local and remote service information managers, so that in step 825, the local and remote service information managers could continue querying a service index based on step 824, so that the next hop address intermediator is obtained and is returned to the intermediator via the reglet container in step 826. Then the subsequent operations shown in FIG. 8 will continue to be executed.

According to the above description, the present invention improves the limitations of the prior-art SOA or web service resulting from the use of the UDDI standard, by only passing a service index (instead of service metadata) among the service registries.

In addition, those skilled in the art will realize that the embodiments of the present invention can be provided in the form of method, system or a computer program product. Thus, the present invention can adopt the form of full-hardware embodiments, full-software embodiments or embodiments of the combination of hardware and software. The typical combination of hardware and software can be a universal computer system with a computer program, when the program is loaded or executed, the above method can be performed by controlling the computer system.

The present invention can be embedded into a computer program product, which comprises all the features which enable the described method to be implemented. Said computer program product is contained in one or more computer readable storage media (comprising but not limited to a disk storage, a CD-ROM, an optical memory and the like), and said computer readable storage media have computer readable codes contained therein.

The present invention is explained above with reference to the flow charts and/or block diagrams of the method, system and computer program product according to the present invention. Each block in the flow charts and/or block diagrams and the combination of the blocks therein can be obviously realized by computer program commands. These computer program commands can be supplied to a processor of a universal computer, a dedicated computer, an embedded processor or other programmable data processing devices to produce a machine, so that the commands (through the processor of a computer or other programmable data processing devices) produces an apparatus for realizing the functions specified in one or more blocks in the flow charts and/or block diagrams.

These computer program commands can also be stored to read memories of one or more computers, and each of the read memories can direct the computer or other programmable data processing devices to function according to a specified mode. Thus, the commands stored in the computer read memories produce a manufacturing product which comprises commanding means for realizing the functions specified in one or more blocks in the flow charts and/or block diagrams.

The computer program commands can also be loaded to one or more computers or other programmable data processing devices so as to perform a series of operating steps on said computers or other programmable data processing devices, so that a computer-implemented process can be produced on each of these devices. Thus, the commands executed on these devices provide the steps specified in one or more blocks in the flow charts and/or block diagrams.

Referring to the preferred modes for carrying out the present invention, the principles of the present invention are explained above. However, these explanations are only exemplary but should not be understood as any limitation to the present invention. Those skilled in the art can modify and transform the present invention, without departing from the scope defined by the enclosed claims.

The invention claimed is:

1. A service registry, connected with a local service domain and a remote service registry, comprising:
   a processor executing a local service information manager for registering local services in the local service domain,
   a local service information repository connected with the local service information manager, for storing service metadata of the local services;
   wherein said service registry further comprises:
   a remote service information manager connected with the local service information manager and the remote service registry, for receiving a remote service index from the remote service registry;
   a reglet portion connected with one of the local service information manager and the remote service information manager, and which performs a corresponding reglet function before the request from the intermediator is sent to the local service information manager or the remote service information manager; and
   a remote service information repository connected to said remote service information manager, for storing the remote service index received from the remote service registry.

2. The service registry according to claim 1, wherein said local service information manager further comprises program commands executable via a processor for dynamically tracking real-time status of the local services and updating the local service information repository in response to a change in the local services.

3. The service registry according to claim 1, wherein said local service information manager further comprises program commands executable via a processor for transmitting a service index in service metadata of the local services and an update thereof, to said remote service information manager, and said remote service information manager further comprises means for propagating the service index in the service metadata of the local services and the update thereof, to the remote service registry.

4. The service registry according to claim 1, wherein said remote service information manager is further connected with an intermediator in the local service domain and comprises program commands executable via a processor for receiving from the intermediator a request performed by a service requestor for invoking specific services in a remote service domain, acquiring an address of a next hop intermediator which the request is forwarded to in accordance with a service index of the specific services, and returning the request to said intermediator.

5. The service registry according to claim 1, wherein said reglet portion comprises: one or more reglets and a reglet container,
   wherein the reglet container is used for providing runtime environment and context information for the reglets, for receiving the request from the intermediator and querying a basic policy and invoking all related reglets, and further for returning service index information to the intermediator;
   wherein the one or more reglets are associated with said reglet container, for performing the corresponding reglet function of the service request received from the intermediator and then providing the service request to the local service information manager or the remote service information manager.

6. The service registry according to claim 5, wherein said reglet portion is further connected with an external system and used as an entry for said external system to the service registry, said external system comprising at least one of: a security system for global security policies, a billing system for services for commercial use, a network traffic system for QoS, a BI system that needs statistic information for data-mining and decision-making, and a business rule system for business contracts based on service selection.

7. The service registry according to claim 1, further comprising:
   a basic connection policy repository connected with the remote service information manager, for storing description of basic policies of connections established among the service registries.

8. The service registry according to claim 1, further comprising a query handler connected with the local service information manager and/or a remote service index manager, for handling a request for querying service information to the service registry.

9. The service registry according to claim 8, wherein said query handler operates in one of two operation modes comprising:
- a first mode, wherein in response to receiving the request for querying service information from a local service domain, said query handler requests both the local service information manager or the remote service index manager to locate the service and sends a response to the service requestor; and
- a second mode, wherein in response to receiving a request from the remote service registry, said query handler requests the local service information manager and returns the local service information to said remote service registry.

10. The service registry according to claim 9, wherein said local service information manager further comprises means for extracting a service index from service metadata of the local services.

11. A method for sharing information among service registries, said service registries being interconnected, said method comprising:
- registering service metadata of a service provider to a local service registry of said service provider;
- said service registry propagating a service index in said service metadata to a remote service registry;
- a reglet portion of the local service registry receiving requests from a service requestor;
- a reglet container in the reglet portion searching for a connection policy in a basic connection policy repository, and invoking a corresponding reglet; and
- the reglet performing a corresponding reglet function to said service invoking request.

12. The method according to claim 11, further comprising said local service registry propagating the service index in said service metadata to the remote service registry according to a predefined connection policy.

13. The method according to claim 11, wherein said registering step comprises:
- at least one of the service provider and a third party registering services to the local service registry; and
- the local service registry discovering and registering said services by means of automatic discovery.

14. A method for a service requestor to query service information to service registries, said service registries being interconnected, said method comprising:
- said service requestor sending a request for querying service information to a local service registry;
- a reglet portion of the local service registry receiving the request from the service requestor;
- a reglet container in the reglet portion searching for a connection policy in a basic connection policy repository, and invoking a corresponding reglet;
- the reglet performing a corresponding reglet function to said service invoking request;
- said local service registry, according to a service index of remote services, forwarding said request to a related remote service registry, until the request arrives at one or more target remote service registries;
- said one or more target remote service registries sending, back to said local service registry, the requested service metadata as a response; and
- said local service registry sending said response to said service requestor.

15. The method according to claim 14, wherein the step of said service requestor sending the request for querying service information to the local service registry includes said service requestor sending a request for querying services with specific parameters to the local service registry.

16. The method according to claim 14, wherein said one or more target remote service registries send, back to said service registry, the requested service metadata as a response along a path in which the request was transmitted.

17. A method for a service requestor to invoke services in a remote service domain, the method comprising:
- said service requestor sending a request for invoking the services in the remote service domain to an intermediator, and the intermediator sending said request to a local service registry;
- said local service registry transmitting the request to the remote service domain by querying a service index;
- said local service registry acquiring, from querying the service index, a next hop intermediator to which the request should be forwarded;
- a reglet portion of the local service registry receiving the request from the service requestor;
- a reglet container in the reglet portion searching for a connection policy in a basic connection policy repository, and invoking a corresponding reglet;
- the corresponding reglet performing a corresponding reglet function to said service invoking request;
- an intermediator in the remote service domain sending said request to service registries associated with said remote service domain; and
- the service registries associated with said remote service domain sending said services to said service requestor via the intermediator in said remote service domain, to provide said services to said service requestor.

18. The method according to claim 17, wherein said local service registry transmitting the request to said remote service domain by querying the service index further comprises:
- said local service registry acquiring, by querying the service index, an address of a next hop intermediator to which the request is forwarded, and returning said address to said intermediator, wherein said intermediator forwards the request to the next hop intermediator; and
- repeating said acquiring, returning and forwarding steps, until said request arrives at the intermediator in the remote service domain.

19. The method according to claim 18, further comprising:
- sending the invoking request to which the corresponding reglet function has been performed and which has a specific connection policy, to local and remote service information managers; and
- the local and remote service information managers querying the service index to acquire the next hop intermediator.

20. A computer program product, which contains a plurality of instructions readable by a computer system on one or more computer readable storage media, wherein said instructions are executed by a processor of the computer to provide a method for a service requestor to invoke services in a remote service domain, said method comprising:
- said service requestor sending a request for invoking the services in the remote service domain to an intermediator, and the intermediator sending said request to a local service registry;
- said local service registry transmitting the request to the remote service domain by querying a service index;
- a reglet portion of the local service registry receiving the request from the service requestor;
- a reglet container in the reglet portion searching for a connection policy in a basic connection policy repository, and invoking a corresponding reglet;
- the reglet performing a corresponding reglet function to said service invoking request;
- an intermediator in the remote service domain sending said request to service registries associated with said remote service domain; and
- the service registries associated with said remote service domain sending said services to said service requestor via the intermediator in said remote service domain, to provide said services to said service requestor.

* * * * *